Feb. 27, 1934.  C. F. A. EDDY  1,949,297
SIGNAL DEVICE
Original Filed May 24, 1929   3 Sheets-Sheet 1
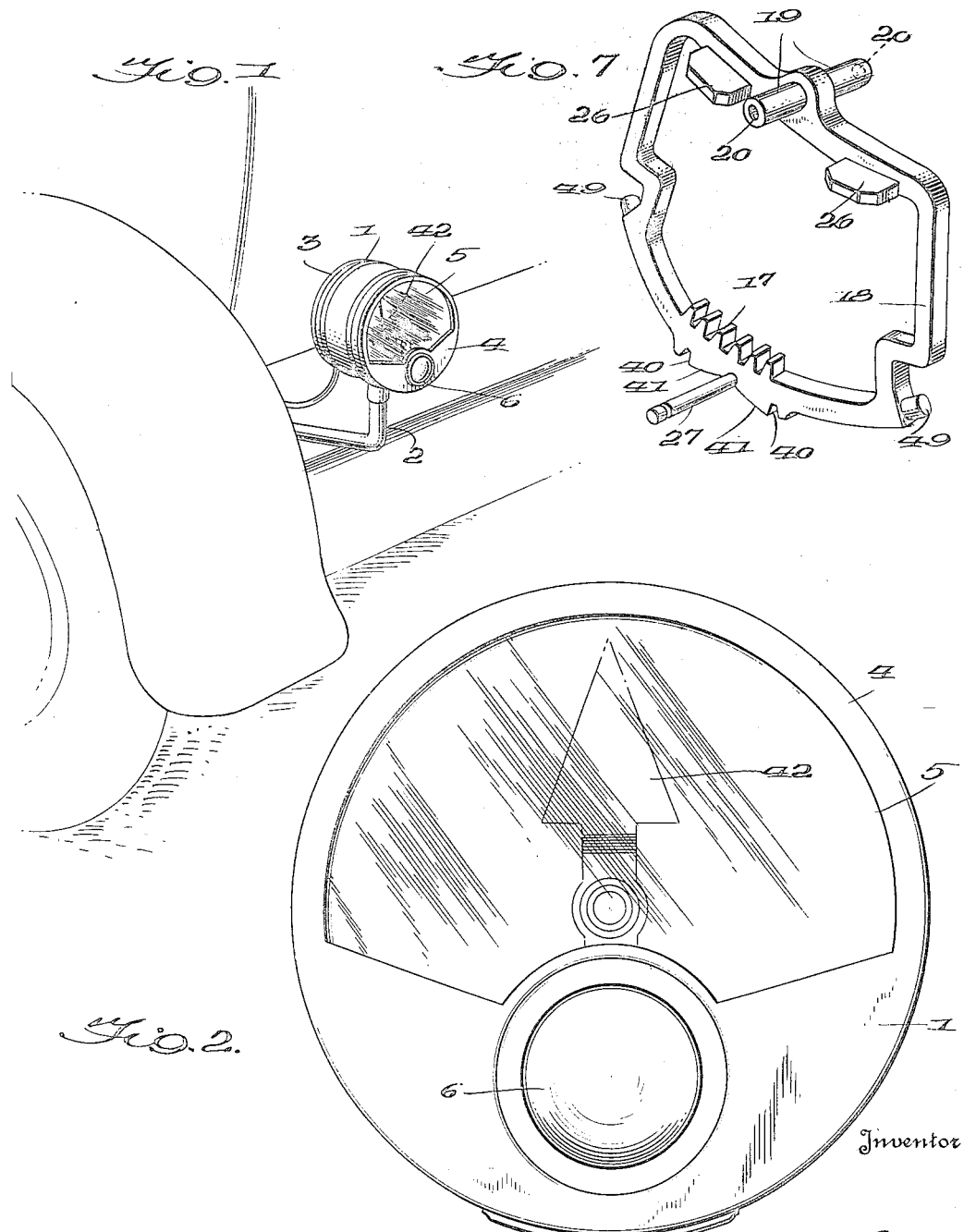

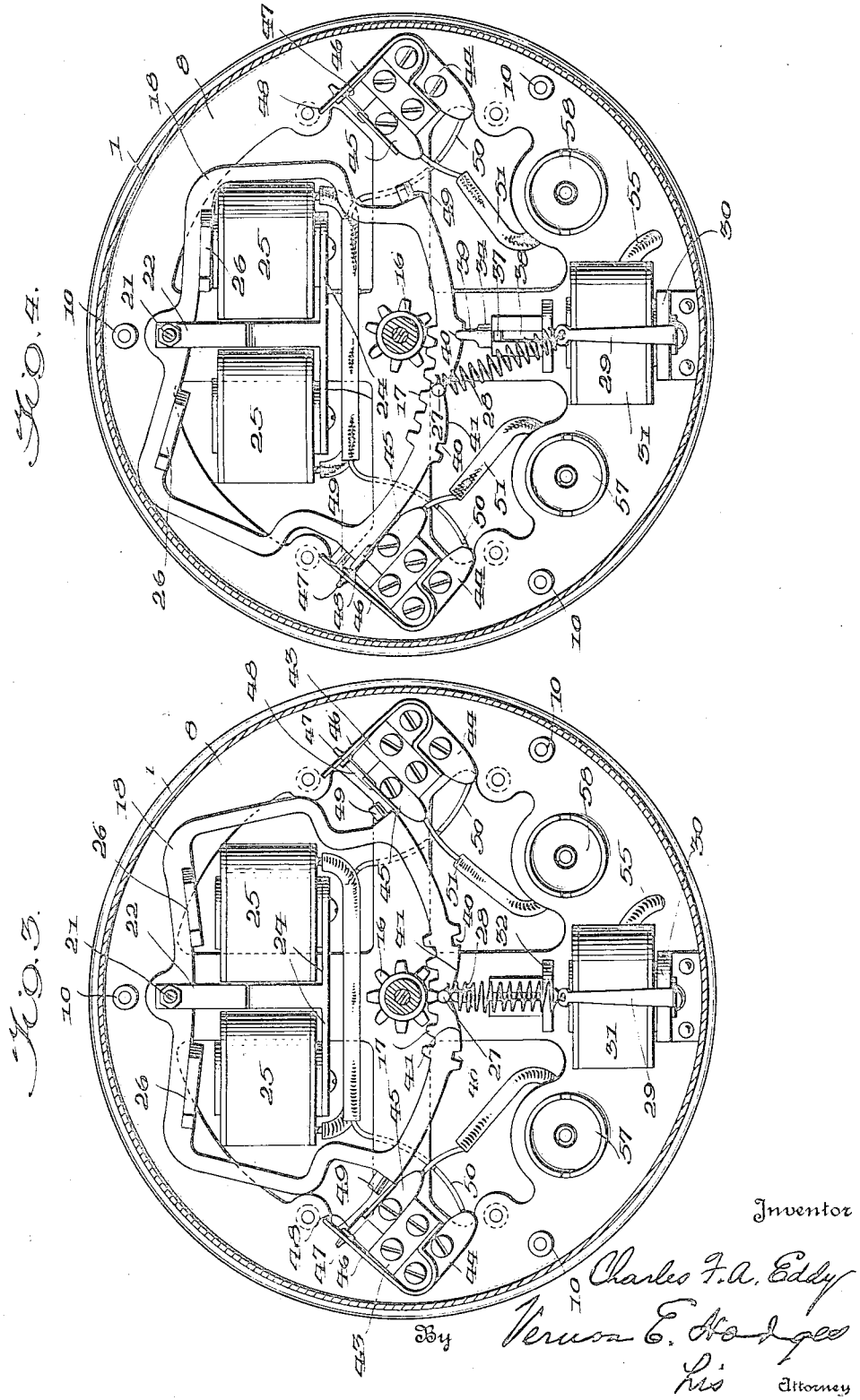

Feb. 27, 1934.    C. F. A. EDDY    1,949,297
SIGNAL DEVICE
Original Filed May 24, 1929    3 Sheets-Sheet 3
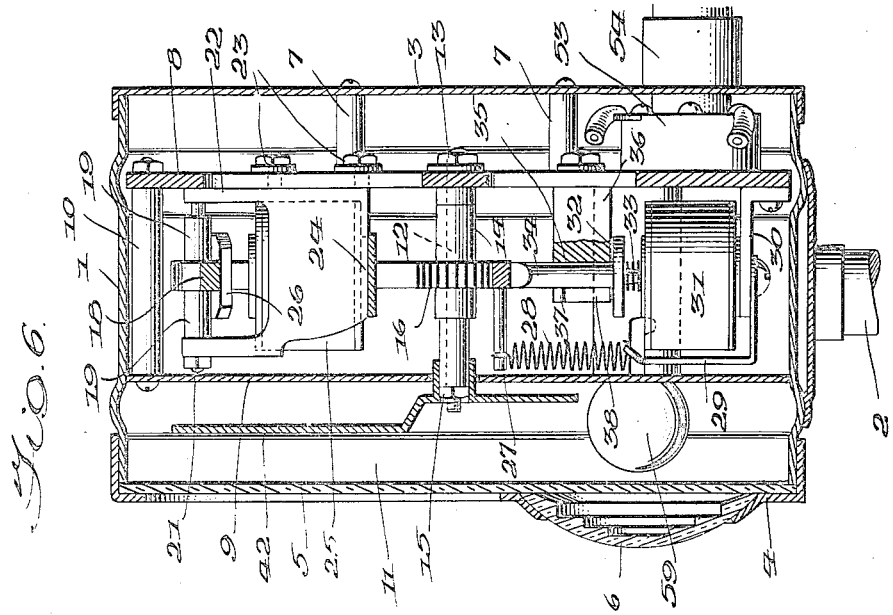
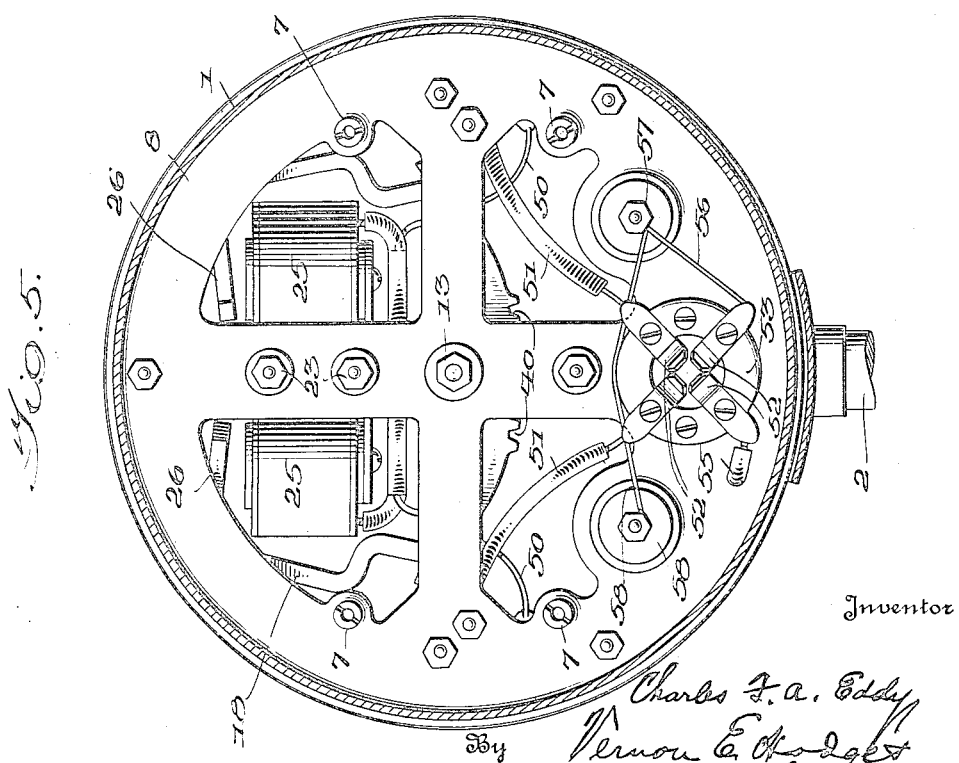

Patented Feb. 27, 1934

1,949,297

UNITED STATES PATENT OFFICE 1,949,297

SIGNAL DEVICE

Charles F. A. Eddy, New London, Conn.

Application May 24, 1929, Serial No. 365,670
Renewed January 18, 1934

7 Claims. (Cl. 177—327)

This invention relates to an improvement in signal devices and is provided for use on an automobile to indicate the direction in which the driver intends to turn.

The object of the invention is to simplify the construction and operation of a signal device of this character and to provide it for use in either daylight or at night and yet to entirely enclose the operating parts within a tight casing to exclude water, dust and foreign substances. The signal may be properly illuminated automatically for use at night as well as in daylight and it may also contain a tail light lens constantly illuminated, thus eliminating the additional light that would otherwise be required.

In the accompanying drawings:

Fig. 1 is a perspective view showing the invention applied;

Fig. 2 is a face view of the signal;

Fig. 3 is a cross sectional view through the signal;

Fig. 4 is a similar view showing the parts in an extreme position;

Fig. 5 is another cross sectional view through the signal;

Fig. 6 is a transverse sectional view through the signal; and

Fig. 7 is a detail perspective view of the sector.

The casing of the signal is designated generally by the numeral 1 and is designed to be mounted in a convenient position on either the front or rear of the motor vehicle and in a convenient position for indicating the direction in which the operator intends to turn. A support 2 of any suitable form may be used to support the casing 1 on the desired portion of the vehicle.

As shown in Fig. 6, a back plate 3 closes one end of the casing 1, while the opposite end is partly closed by a segmental plate 4, behind which a glass disk 5 is positioned, and the plate 4 also carries a colored lens 6, which serves as a tail light for the vehicle.

Carried by studs 7, which are supported from the back plate 3, is a support 8 extending transversely within the casing 1, as shown in Figs. 5 and 6. A disk 9 is also mounted within the casing 1 in spaced relation from the support 8, being held in place by bars 10 which extend between this disk 9 and the support 8. The disk 9 is also spaced from and disposed behind the glass disk 5, forming a chamber 11 therebetween.

A stud 12 is fixed to the support 8 by means of the nut 13 and extends forwardly through an opening in the disk 9. Journaled on this stud 12 is a sleeve 14 held in place thereon by a nut 15 secured on the outer end of the stud.

A pinion 16 is carried by the sleeve 14 in position to and normally in mesh with the teeth 17 formed on the inner, lower edge of a sector 18. This sector 18 is provided with oppositely projecting trunnions 19 at the center of its upper side, as shown in Fig. 7, the outer ends of which are recessed as at 20 to receive pins 21 which extend into these recesses from a yoke 22, one of said pins 21 being adjustable and removable through the yoke to permit the sector to be removed or adjusted. The yoke 22 is held in place rigidly by nuts 23 which secure it to the support 8, as clearly shown in Fig. 6.

Extending in opposite directions from the lower end of the yoke 22 are arms 24, upon which are mounted electro-magnets 25 immediately beneath soft iron armatures 26 fixed to and supported by the sector 18 on opposite sides of the trunnions 19. These armatures 26 are disposed well within the fields of the magnets 25 to be acted on by said magnets whenever the latter are respectively energized.

The sector 18 is normally held in a central position, and for this purpose is provided with a pin 27 at the lower side thereof, with which a spring 28 is connected, which extends from the pin 27 to an arm 29 (see Fig. 6), this arm being secured to a bracket 30 which is carried by and extends forwardly from the support 8.

Also mounted on the bracket 30 is a lockmagnet 31 having an armature 32 disposed thereabove and within the field thereof to be acted on by this magnet whenever energized. The armature 32 is normally pressed upward by means of a spring 33 interposed between the same and the core of the magnet. Connected with the armature 32 is a pin 34 slidably mounted through an opening 35 in a bracket 36. A lug 37 is carried by the pin 34 and slides in a groove 38, which groove communicates with the opening 35 in the bracket 36. The upper end of the pin 34 is wedge-shaped as at 39 and is adapted to be pressed into the notches 40 formed in the lower side of the sector 18 on opposite sides of the center thereof. The bottom of the sector 18 between the notches 40 is provided with inclined surfaces 41, against which the wedge-shaped upper end 39 of the pin 34 is normally pressed by the spring 33. The pin 34 is guided in its up and down movement by the lug 37 in the groove 38, which holds it against turning in the opening 35.

An indicating arm 42 is carried by the sleeve 14 and is mounted within the space 11 immediately behind the glass disk 5 to be visible therethrough.

Fixed to the support 8 are insulating blocks 43, each of which carries conductor-plates 44 and 45, the plate 44 having fixed thereto one end of the spring contact carrying member 46 supporting a contact 47 in position to engage a contact 48 fixed to the plate 45. The spring member 46 protrudes outward beyond the contacts and is in position to be engaged by an insulating lug 49 carried by the outer side of the sector 18.

The conductor-plates 44 are connected through wires 50 with one side of the magnets 25, the plate 44 mounted on one side being connected with the magnet on the opposite side of the signal. The other sides of the magnets 25 are grounded. The plates 45 are connected through the wires 51 with contacts 52 carried by a socket 53 in position to receive electrical current through a plug 54. A wire 55 extends from another one of the contacts 52 to the lock magnet 31, the other side of which is likewise grounded. A wire 56 extends from another contact 52 to a socket 57, from which another wire 58 extends to a companion socket 58', these sockets being mounted on opposite sides of the casing and carried by the support 8 and extending into position to receive electrical illuminating lamps 59 adapted to be disposed within the space 11 for illuminating the space, the arm 42 and the tail lens 6.

Electrical current may be supplied to the signal from any suitable source of supply, which is usually a battery carried by the automobile, one side of which battery is ordinarily grounded to the frame and one side of the electrical parts of the signal may also be grounded. A switch of suitable and convenient construction may be used to control the electrical circuits for the signal device, and such a switch, which may be used in connection herewith, is disclosed and set forth in the companion application executed and filed of even date herewith.

In the operation of the signal, the lamps 59 need not be illuminated for use during the day time but would be constantly illuminated when the signal is used at night, not only for illuminating the signal but also the tail light 6.

When it is desired to turn either to the right or the left, the switch (not shown) is manipulated to close the proper electrical circuit to the corresponding one of the electro-magnets 25, which energizes said magnet, attracting the armature 26 and swinging the sector 18 on its trunnions 19 to the position shown in Fig. 4 for instance. During this movement, the teeth 17 engaging the pinion 16 have caused a turning of the latter and with it the sleeve 14 and indicating arm 42 to an extreme position, said arm indicating the corresponding direction in which the operator desires to turn. At the same time, the wedge-shaped end 39 of the pin 34 has been forced back by the inclined edge 41 and dropped into the notch 40 by reason of the action of the spring 33 on this pin, where it holds the sector 18, locking the same in this position until released. The movement of the sector 18 into this position has caused the insulating lug 49 to abut against the spring member 46, separating the contacts 47 and 48, which breaks the circuit to the energized magnet 25 and deenergizes the magnet.

This compels the circuit to remain broken until the signal is again operated, preventing the danger of burning out the magnet windings if a switch contact was carelessly permitted to stand in an improper position, thereby preventing accidents to the electrical system and also saving the battery current. Furthermore, this does not immediately deenergize the magnet because it is well known that an electrified magnet remains energized up to its full charge after the current has ceased to flow and for a short space of time.

After the operator has made the designated turn, he manipulates the switch to return the indicating arm 42 to its central position. This is accomplished by energizing the magnet 31, which attracts the armature 32 to release the pin 34 from the notch 40, which allows the spring 28 to return the sector to its central position, as shown in Fig. 3, and which likewise returns the indicating arm 42 to its central position.

The energizing of the other magnet 25 causes a corresponding turning of the indicating arm 42 in the opposite direction to indicate the intention of the operator to turn in a corresponding direction.

This signal device is of simplified structure, having all of the operative parts enclosed within a tight casing, excluding dust and dirt and all foreign matter which might interfere with its proper manipulation and operation. It also provides for locking the indicator in a set position after it has been turned to indicate the intention of the operator to turn the vehicle and until the parts are released to be moved back to their normal positions.

By the term "annular" as used in the claims is intended a frame structure not necessarily round but this sector may be of any suitable confining shape such for instance as polygonal, as shown. The term "annular" is used to include such polygonal shape.

I claim:

1. A signal indicator including a casing, a shaft mounted therein, an indicating arm carried by said shaft, a sector in annular form having one side pivotally mounted within the casing and having the inner edge of its opposite side geared to the shaft for causing a movement of the indicating arm to an extreme indicating position, electro-magnets disposed in position to act on the first-mentioned side of said sector, said sector having notches in its outer edge, and electro-magnetically actuated means for engaging in the notches to releasably hold the sector in an extreme indicating position.

2. A signal indicator including a casing, a support mounted therein, a shaft journaled in said support, an indicating arm carried by said shaft, a yoke supported by the casing and having arms extending in opposite directions therefrom, electro-magnets supported by said arms, a sector having trunnions pivotally supported within the yoke and being in position to be actuated by the electro-magnets, said sector having its inner edge geared to the shaft and having notches on an outer side thereof in spaced relation, a pin slidably mounted in the support in position to enter the notches and hold the indicating arm in extreme indicating positions, a spring normally acting on said pin, an armature connected with the pin, an electro-magnet in position to act on the last-mentioned armature to release the pin, and a spring connected with the sector for returning the sector to a central position.

3. In a signal, the combination of a casing, a movable signal indicator, electro-magnets within the casing, a sector of generally annular shape extending about and enclosing the electro-magnets within the confines thereof, a pivotal support for the sector disposed approximately in a plane extending midway between the electro-magnets, said sector having armatures co-operating with the electro-magnets, and means operatively connecting said sector with the signal indicator for actuation thereof.

4. In a signal, the combination of a casing, a movable signal indicator, electro-magnets within the casing, a sector of generally polygonal shape extending about and enclosing the electro-magnets within the confines thereof, said sector having armatures cooperating with the electro-magnets, a pivotal support for the sector disposed approximately in a plane extending midway between the electro-magnets, and means disposed within the confines of the sector for operating the signal indicator thereby.

5. In a signal, the combination of a casing, a movable signal indicator, electro-magnets within the casing, a sector of generally polygonal shape extending about and enclosing the electro-magnets within the confines thereof, said sector having armatures cooperating with the electro-magnets, a pivotal support for the sector within the casing disposed approximately in a plane extending midway between the electro-magnets, a shaft for actuating the signal indicator and having the axis thereof extending within the confines of the sector, and gearing between the sector and said shaft for actuating the same from the sector.

6. In a signal, the combination of a casing, a movable signal indicator, electro-magnets within the casing, a sector of generally annular shape extending about and enclosing the electro-magnets within the confines thereof, said sector having armatures cooperating with the electro-magnets, a pivotal support for the sector disposed approximately in a plane extending midway between the electro-magnets, and a gear actuated by the sector and operatively connected with the signal indicator for moving said signal indicator.

7. In a signal, the combination of a movable signal indicator, electro-magnets, a sector of generally annular shape extending about and enclosing the electro-magnets within the confines thereof, a pivotal support for the sector disposed approximately in a plane extending midway between the electro-magnets, said sector having armature means on a side facing the electro-magnets and in position to be acted on by the electro-magnets, and means operatively connecting said sector with the signal indicator for actuation thereof.

CHARLES F. A. EDDY.